VOICE COMMUNICATION CIRCUIT EVALUATOR

Filed July 28, 1961 3 Sheets-Sheet 1

$$Y_\ell(S)/P(S) = F(S) \cdot G_\ell(S)$$

INVENTOR
J. L. FLANAGAN
BY C. E. Hirsch Jr.
ATTORNEY

INVENTOR.
J. L. FLANAGAN
BY
C. E. Hirsch Jr.
ATTORNEY

VOICE COMMUNICATION CIRCUIT EVALUATOR

Filed July 28, 1961 3 Sheets-Sheet 3

INVENTOR.
J. L. FLANAGAN
BY G. E. Hirsch Jr.
ATTORNEY

United States Patent Office 3,113,187

Patented Dec. 3, 1963

3,113,187
VOICE COMMUNICATION CIRCUIT EVALUATOR

James L. Flanagan, Warren Township, Somerset County, N.J., assignor to Bell Telephone Laboratories, Incorporated, New York, N.Y., a corporation of New York Filed July 28, 1961, Ser. No. 127,585
12 Claims. (Cl. 179—175.1)

This invention relates to the testing of voice communication systems and, more specifically, to apparatus whereby the quality of such systems can be evaluated rapidly and with a minimum of auxiliary equipment.

It is an object of the invention to effect a rapid and comprehensive test of a voice communication system.

It is a further object of the invention to obtain a qualitative measure of the performance of a voice communication system in terms of the subjective loudness of signals and interfering noise present in such a system.

It is a further object of the invention to simplify the testing of telephone transmission circuits without requiring subjective interpretation on the part of an operator.

It is still a further object of the invention to effect evaluation of the transmission quality of a voice communication system by a direct meter reading.

Various forms of electrical disturbances in a telephone circuit result in acoustic noise at the output of the receiver of the telephone instrument. Much of this noise, for example, impulse noise arising from dialing operation and pulsive transients arising from central office switching, is detected by the human ear. Depending on their amplitude, frequency and repetition rate, such noise pulses may be merely slightly annoying or they may be obtrusive enough to impair seriously the reception of a telephone message. In order to insure a high standard of service for the telephone user, apparatus for measuring electrical noise must be provided. Since the mechanism of the human ear is a complex one involving highly nonlinear processes, it is much more meaningful to work with physical quantities which reflect intimately the characteristics of human hearing than to work with objective measures which are only loosely related to perception. An ideal instrument, therefore, should respond to noise signals in essentially the same manner as the human ear. Further, when applied to a telephone or voice communication circuit, it should indicate directly a quantitative, subjective response. For example, it should indicate that the signal level of a line has a subjective loudness of *s* sones, or that it has a pitch of *m* mels, or that it is below the threshold of audibility for a prescribed class of signals, or that it presents *a* units of annoyance, or the like. Conventional measuring instruments such as voltmeters, VU indicators, ammeters, watt meters, and the like, do not do this. They provide objective measures which are related only indirectly to a subjective percept, and then in a complex and often non-unique manner.

As a means of avoiding these difficulties, there is provided in accordance with this invention equipment for forming an indication of the threshold of audibility of a particular class of signals based on essentially the same data and in the same manner as the human ear.

Psychoacoustic tests show that the audibility of noise signals, for example, pulses arising from dial and switchgear transients in a telephone system, is chiefly dependent upon two quantities, namely, the rate at which pulses are produced and the duration of the pulses. Audibility is not influenced by the electrical polarity, i.e., acoustic condensation or rarefaction, of the pulses. If clicks are generated at rates less than about one hundred per second, the human ear hears them such that the threshold is independent of pulse rate and dependent only upon pulse duration. If the clicks are produced at a rate greater than one hundred per second, the human threshold of audibility, i.e., the pulse amplitude just sufficient for detection, decreases both with increasing rate and duration. In the ear, incident sound waves are transmitted via the ear drum and the ossicle linkage to the cochlea where they produce longitudinal waves in the cochlear fluid. This disturbance is transmitted to the basilar membrane which vibrates selectively with a maximum deflection at some point along its length. For this much of the mechanism, linear acousto-hydromechanical relations apply. The endings of the auditory nerve terminate in the organ of Corti on the basilar membrane, and the latter's displacements are converted into electrical neural signals by a highly nonlinear process before being transmitted to the brain. Recent analyses with mathematical models of the ear show that the type of pulses under consideration produce maximal displacements of the basilar membrane near its mid-region, about twenty millimeters from the stapes.

The present invention turns these considerations to account by making use of a linear electrical circuit that simulates the transmission properties of the middle ear and the basilar membrane. The circuit treats pulse rate, pulse duration, and pulse amplitude in the same manner as the human ear. When stimulated, as by a dial or switch-gear transient in a telephone circuit, an output signal analogous to the central displacement of the basilar membrane is produced. This displacement signal is used to actuate a highly nonlinear circuit comprising typically, a rectifier, a low-pass filter, a power-law device, and a peak-reading instrument. The output signal developed by the composite circuit is then proportional to the magnitude of subjective loudness. For threshold conditions, the subjective loudness, or the subjective percept, is the same. That is, all threshold conditions of pulse rate, duration, polarity pattern and amplitude produce the same, constant reading on the output meter. For a given pulse rate and duration, a pulse amplitude less than the threshold value produces a meter reading less than the single threshold value and, conversely, a greater pulse amplitude produces a meter reading greater than the single threshold value. With slight variation of circuit parameters, the output meter may be calibrated to indicate any one, or more, of a variety of subjective quantities.

The invention will be more fully understood by reference to the specific embodiments illustrated in the drawings and the following description.

Figure 1A:
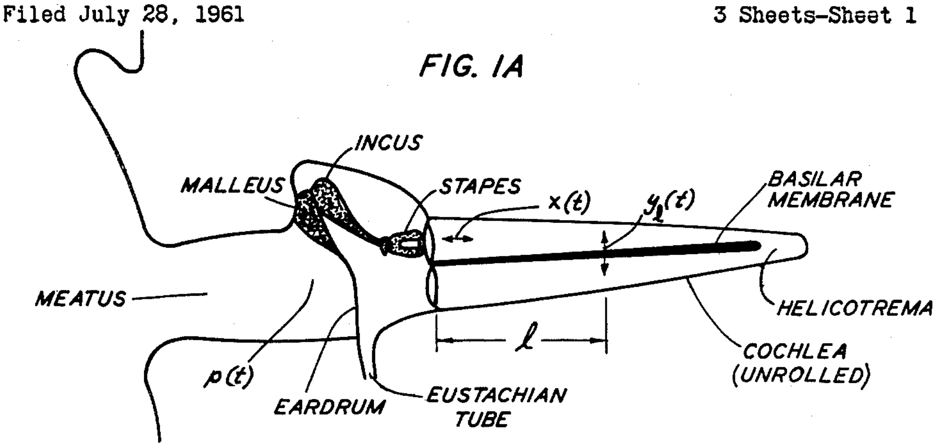
FIG. 1A is a schematic representation of the human ear.

FIG. 1A is a schematic drawing of the peripheral components of the human ear. The cochlea, normally a spiral cavity in man, is shown unrolled for simplicity. A sound wave impinging on the ear is led down the external meatus (canal) and sets the ear drum into vibration. This vibration is transmitted through the middle ear by the ossicles; the malleus, incus and stapes (hammer, anvil and stirrup). The latter three bones form, in effect, a mechanical linkage for passing the vibration into the fluid-filled container that is the cochlea. The cochlea is partitioned longitudinally by the basilar membrane. This membrane, which is about 35 millimeters long, is frequency selective and the portion of it set into vibration is dependent upon the frequency content of the impinging sound wave. The quantity $p(t)$ represents sound pressure at the ear drum as a function of time; $x(t)$ is the linear displacement of the stapes; and $y_l(t)$ is the displacement of the basilar membrane at a distance $l$ from the stapes. The latter function, and possibly its time and spatial derivatives, have great importance in the mechanism of hearing for it is this displacement which is converted to neural activity and transmitted to the brain. The peripheral organ can be considered mechanically linear and passive over the frequency and amplitude ranges of interest.

Figure 1B:
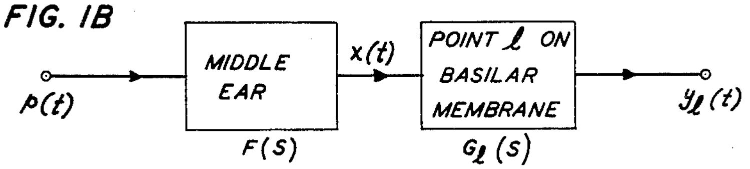
FIG. 1B is a block diagram equivalent of the ear in terms of circuit transfer functions.

An approximation of the transmission characteristics of the middle ear and the basilar membrane may be made by letting capital letters represent frequency-domain transforms of the foregoing time functions. The Laplace transform of the transmission from the ear drum to a point $l$ on the membrane is therefore:

$$\frac{Y_l(s)}{P(s)}=\frac{X(s)}{P(s)}\cdot\frac{Y_l(s)}{X(s)}=F(s).G_l(s) \qquad (1)$$

where $s$ is the complex frequency. This functional relation for the ear is indicated by the block diagram in FIG. 1B. From experimental acoustophysiological data, analytical approximations for $F(s)$ and $G_l(s)$ are constructed as follows:

$$F(s)=\frac{c_1}{(s+a)[(s+a)^2+b^2]} \qquad (2)$$

$$G_l(s)=c_2\cdot\frac{\beta_l^{r+4}}{(\beta_l+k)^r}\cdot\frac{s}{s+\beta_l}\cdot\frac{e^{-3\pi/\beta_l}}{[(s+\alpha_l)^2+\beta_l^2]^2} \qquad (3)$$

where $c_1$ and $c_2$ are positive real constants,
$b=2a=2\pi\cdot 1500$ rad/sec.,
$\beta_l=2\alpha_l$,
$k=2\pi\cdot 1000$ rad/sec.,
$r=0.8$ Procedures for formulating $G_l(s)$ are set forth in 39 Bell System Technical Journal 1163, September 1960.

Figure 2:
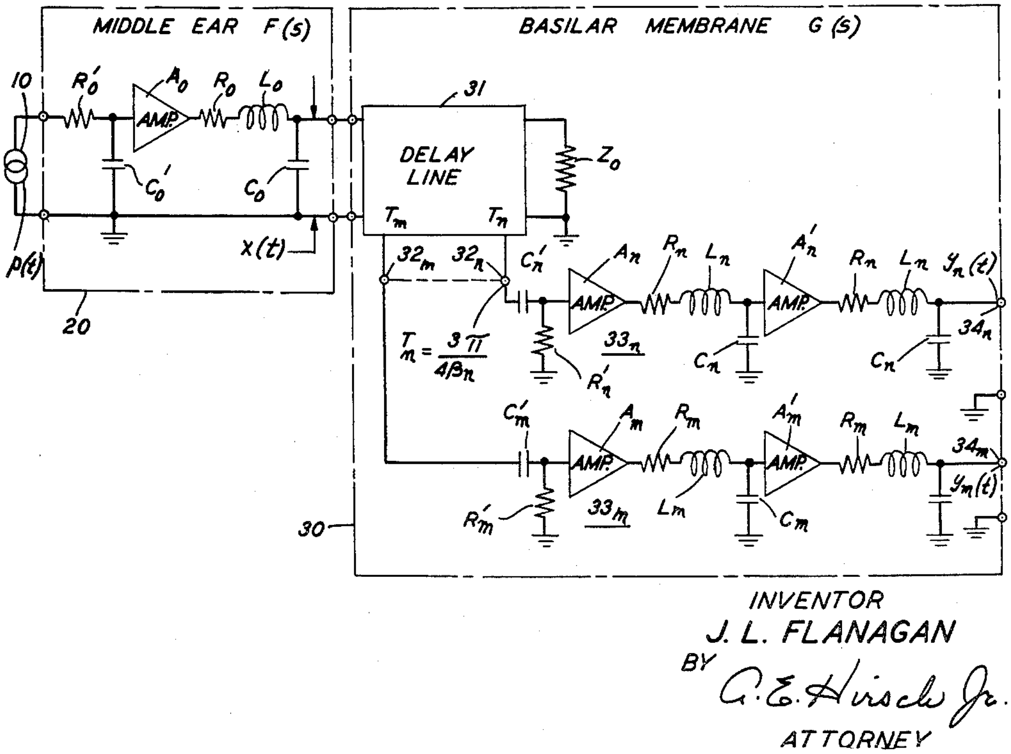
FIG. 2 is a schematic diagram of an electrical network approximation to the middle ear and basilar membrane.

In accordance with the present invention, an electrical network is constructed whose transmission properties are substantially identical to the functions given in Equations 2 and 3. FIG. 2 illustrates such a network. The input of the network is a time varying voltage $p(t)$, e.g., from a source 10, which represents the sound pressure at the human ear drum. The middle ear network 20 comprises resistor $R'_0$ connected in series with a $\pi$ network that includes an amplifier $A_0$, resistor $R_0$ and an inductor $L_0$. Capacitor $C'_0$ shunts the junction of $R'_0$ and $A_0$ to ground and capacitor $C_0$ shunts the output of the network. $A_0$ is a buffer-amplifier, whose fixed gain takes account of the multiplicative constant $c_1$, that yields the correct absolute value of stapes displacement for a given sound pressure. In accordance with the relations specified above, the network elements may be selected as follows: select a convenient value for resistor $R'_0$, for example, 10K ohms. Then, because $$b=2a=2\pi.1500 \text{ and } a=1/R'_0C'_0 \qquad (4)$$
$$C'_0=.02 \text{ microfarad}$$

A convenient value for inductor $L_0$ is then selected, for example, 2 henries. Then, because $$1.25b^2=1L_0C_0 \text{ and } a=R_0/2L_0 \qquad (5)$$
$$C_0=.005 \text{ microfarad and } R_0=19\text{K ohms}$$

The output voltage $x(t)$ of the middle ear portion of network 20 represents the time varying displacement of the stapes. The foot-plate of the stapes acts as a vibrating piston which produces a longitudinal wave in the cochlea fluid.

The basilar membrane portion 30 of the network comprises a delay line 31 terminated in its characteristic impedance $Z_0$ to prevent reflection. The input of delay line 31 is the stapes displacement $x(t)$ from network 20. Successive taps $32_m$ . . . $32_n$ along the line feed a number of networks $33_m$ . . . $33_n$ of similar configuration but of different element values. The output voltages $Y_m(t)$ . . . $Y_n(t)$ of these networks represent the linear displacements of corresponding points along the basilar membrane. For example, the voltage $Y_m(t)$ that appears at output terminal $34_m$ represents the displacement of the basilar membrane at a point close to the stapes (called the basal end). The voltage $Y_n(t)$ that appears at output terminal $34_n$ represents the displacement of the membrane at a point most distant from the stapes (called the apical end). It is these displacements which are crucial to human hearing and which, in the human ear, are converted into electrical activity and transmitted to the brain over the auditory nerve.

The components for the basilar membrane networks are chosen in a manner similar to that employed for selecting components for the middle ear network. For example, consider some point $l$ distance from the stapes, whose simulating network has its output terminal lying between $34_m$ and $34_n$. In this case $$\beta_l=1/R'_lC'_l,\ 1.25\beta_l^2=1/L_lC_l, \text{ and } \alpha_l=R_l/2L_l \qquad (6)$$

Further for illustration, let the membrane point $l$ be the one which responds maximally to 4500 c.p.s.

(i.e., $\beta_l=2\pi\cdot 4500$).

For convenience select $R'_l$ and $L_l$ as 10K ohms and 1 henry respectively. Then $C'_l=0.0035$ microfarads, $C_l=0.001$ microfarad and $R_l=28$K ohms. The value of the delay is $\tau_l=3\pi/4\beta_l$ seconds. As before, amplifiers $A_l$ and $A'_l$ are buffer amplifiers of any desired construction with gains adjusted to give correct absolute values of membrane displacement. These gains are accounted for by the constant $C_2$ in Equation 3.

Figure 3A:
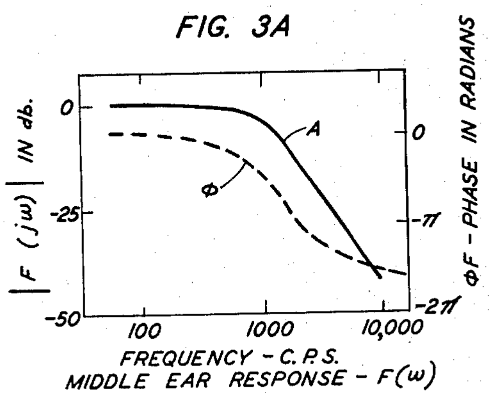
FIGS. 3A and 3B illustrate the amplitude and phase responses of the electrical networks of FIG. 2.
Figure 3B:
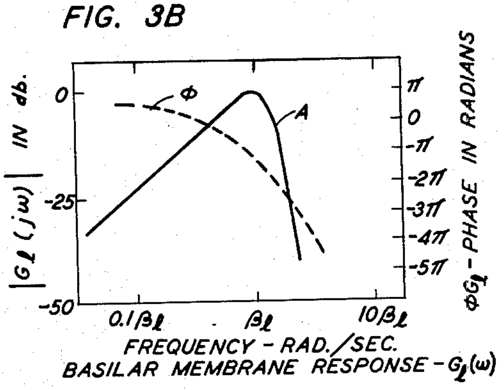
Figure 4:
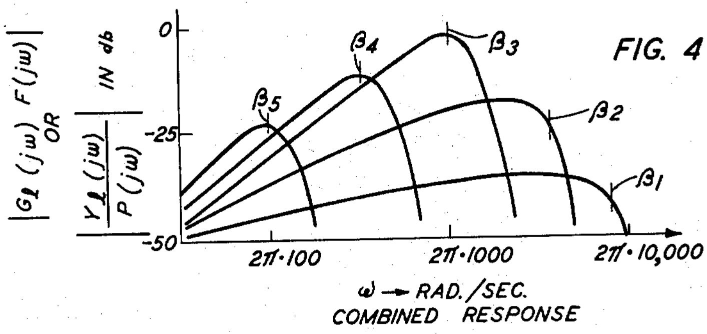
FIG. 4 illustrates the combined amplitude responses for the middle ear and basilar membrane.

The frequency transmission characteristics of the electrical networks of FIG. 2 that are used in the simulation of the ear are shown in FIGS. 3 and 4. These amplitude and phase responses are obtained from Equations 2 and 3 respectively, by letting the complex frequency $s=\omega$. FIG. 3A represents the frequency dependence of the transmission of sound pressure $p(t)$ to the stapes displacement $x(t)$. FIG. 3B represents the frequency dependence of the transmission of stapes displacement $x(t)$ to the displacement $y_l(t)$ of a particular point ($l$) on the basilar membrane. In both of these figures, the curves labeled A represent the amplitude vs. frequency response for the functions and the curves labeled $\Phi$ represent the phase vs. frequency response. The combined middle-ear and membrane amplitude response, for several points along the membrane, is shown in FIG. 4. These curves are obtained by adding, in terms of db, the amplitude (A) curves in FIGS. 3A and 3B.

FIGS. 3 and 4 show two important things about the mechanism of the ear. First, the middle ear transmission has roughly a low-pass characteristic. Second, the resonant response of points along the basilar membrane is approximately constant-Q in nature. That is, the bandwidth of the resonance is roughly proportional to the center frequency. This latter fact causes the time resolution of basal (high frequency) points to be very high and, on the other hand, causes the frequency (rather than time) resolution of apical (low frequency) points to be high. The combined amplitude responses (FIG. 4) show that the membrane displacement is greatest near its mid-portion, that is, for the points which respond maximally at a frequency of about 1000 c.p.s.

Figure 5:
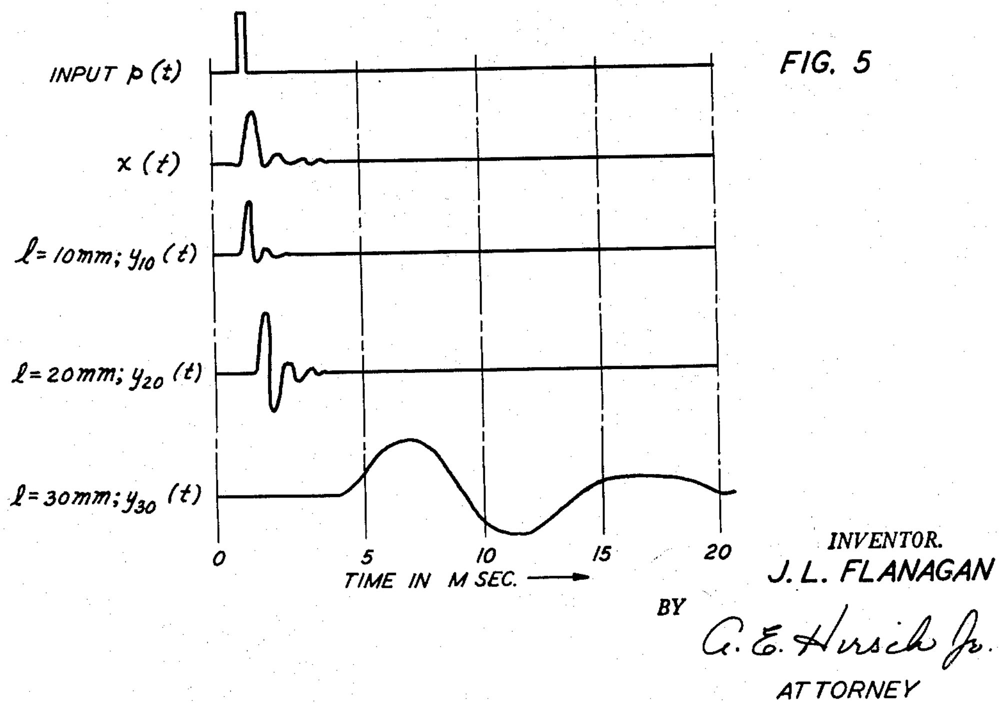
FIG. 5 illustrates the typical displacement responses to an impulse of sound pressure produced at the ear drum.

Typical wave forms of displacement produced by an impulse of pressure at the ear drum are shown in FIG. 5. The input sound pressure $p(t)$ is a sharp, brief rectangular pulse. The resulting stapes displacement $x(t)$, and the basilar membrane displacements at three distances (10, 20, and 30 mm.) from the stapes are shown. In accordance with the previous discussion, the basal displacements (for example, $l=10$ mm.) are also brief and the time resolution is good. The apical displacements on the other hand (for example, $l=30$ mm.), are much slower, indicating greater frequency resolution.

In accordance with the present invention, the electrical circuit (shown in FIG. 7) processes membrane displacement function at its maximally responding point to obtain a measure of the subjective response equivalent to that of the human ear at threshold. This is carried out in a way that yields the same response to all of the conditions indicated by the pulse threshold data in FIG. 6. That is to say, in accordance with the invention the elements of the simulating networks are suitably selected and arranged to modify the significant time function of membrane displacement so that the threshold data is collapsed into a single point, which, in effect, indicates the boundary between audibility and inaudibility. Thus, all threshold combinations of pulse amplitude, polarity, pulse rate, and duration produce the same output condition so that the same reading on a meter is produced by each. Consolidation of data in this fashion is justified since laboratory experiments show that: (*a*) the just-audible pulse amplitude is independent of the pattern of pulse polarity; (*b*) for pulse rates less than about 100 p.p.s., the threshold of audibility is little dependent upon pulse rate, and approaches constant values of pulse amplitude which are determined by pulse energy (or duration); and (*c*) for pulse rates greater than 100 pulses per second (p.p.s.) the threshold diminishes at a rate between three to six db per doubling of pulse rate.

Figure 6:
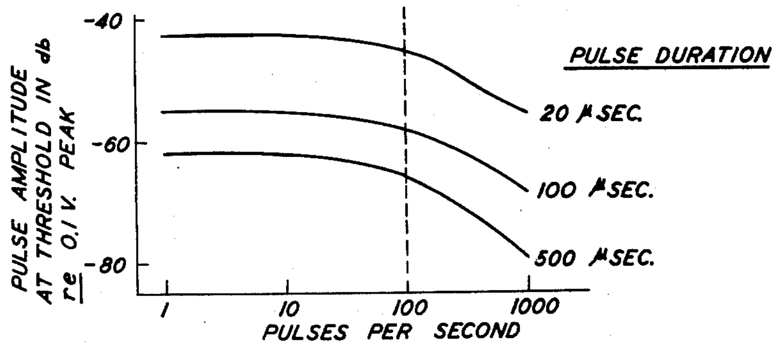
FIG. 6 illustrates the thresholds of audibility (i.e., just detectable amplitudes) for a variety of pulses of different polarity patterns, durations and rates when heard over a calibrated earphone.

The results of such measurements of pulse audibility are shown in FIG. 6. These curves are the results for a variety of patterns of pulse polarity (i.e., sequences of positive and negative pulses). It will be noted that the threshold curves exhibit a change in slope in the neighborhood of 100 p.p.s. From this it follows that a time-constant on the order of ten milliseconds is significant in auditory temporal summation. Experiments have shown in addition that a power-law relation exists between the amplitude of auditory nerve potentials and the amplitude of stimulus sound pressure. Further, psychoacoustic data indicates that for binaural listening, subjective loudness is proportional to the stimulus sound pressure raised to a power of about 0.6. Still further, neuro-physiological results show that neural firings are elicited only on unipolar displacements of the basilar membrane (conventionally upward; that is, toward the tectorial membrane). This latter feature is, in a sense, equivalent to half wave rectification of membrane displacement. In view of these relations, the subjective response is found to be proportional to the result of the following operations: the membrane displacement at its maximally responding point is half wave rectified and integrated over an interval of ten milliseconds; the integrated result is raised to the 0.6 power and its peak value is taken.

A further word in connection with the rectification operation may be useful. The inverse Laplace transform of the combined functions in Equations 2 and 3 is the impulse response of the membrane at a point $l$ in in the basilar membrane. If this response is computed and if the positive and negative half waves are integrated over a duration of the order of ten milliseconds, the positive and negative integrals are found to be nearly equal in magnitude. This is owing to the fact that $G_1(s)$ has a zero at zero frequency and hence the displacement has zero mean value. Half wave rectification, which is highly indicated in the ear physiology, does not, therefore, constitute an operation contrary to the perceptual result that audibility (on threshold loudness) is independent of pulse polarity. In fact, the integral of the half wave differs from the integral of the absolute magnitude only by the constant factor of 2.

Taken together, the above factors indicate that the following measure reflects the constancy of percept (i.e., the constant loudness) for pulsive stimuli:

$$K=\left[\frac{1}{T}\int_0^T |y_1(t)|dt\right]^n \qquad (7)$$

where $|y_1(t)|$ is the magnitude (half wave) of displacement of the membrane at a point about twenty millimeters from the stapes, i.e., at approximately the 1000 c.p.s. point, and $$T=10^{-2}\text{ sec.; p.p.s.}<100\text{ p.p.s.}$$

$$=\frac{1}{\text{p.p.s.}}\text{ sec.}\geq 100\text{ p.p.s.}$$

and $n=0.6$.

Figure 7:
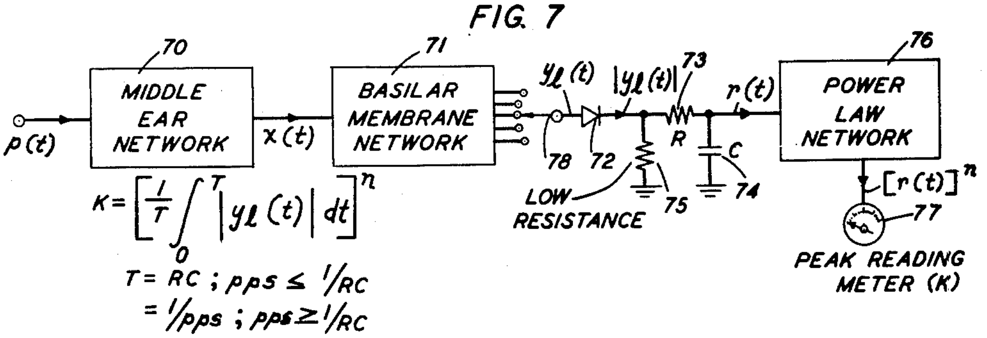
FIG. 7 is a block schematic diagram of a voice communication circuit evaluator for indicating the subjective audibility of pulses in accordance with the present invention.

FIG. 7 shows partially in block schematic form a complete illustrative embodiment of a voice communication circuit evaluator constructed in accordance with the present invention. Its output, K, can be shown mathematically to be equivalent to Equation 7. Middle ear network 70 is an electrical network whose transfer function is identical to F($s$) in Equation 2. One physical realization of this network has already been shown as 20 in FIG. 2. Similarly, basilar membrane element 71 is an electrical network whose transfer function is identical to $G_1(s)$ in Equation 3 where $\beta_1=(2\pi\cdot 1000)$ rad/sec. One realization of this network is the apparatus associated with the tap $l=20$ mm. in network 30 of FIG. 2. The pulse signal input $p(t)$ is an electrical representation of an acoustic pulse heard, for example, in an earphone or telephone receiver. Ordinarily, it is an electrical signal derived from a telephone line. Two examples of typical signals $p(t)$ are shown in line A of FIG. 8. The left side represents noise pulses produced at a slow rate, while the right side represents rapid noise clicks. The basilar membrane displacement voltage $y_1(t)$ produced by the network 71 (shown in line B of FIG. 8) is the output of the tap representing a distance of twenty millimeters from the stapes and is near the center of the membrane. As discussed above, this distance is selected because for this distance the membrane responds maximally to the pulse stimulus. The frequency to which the membrane is most sensitive in its mid-region is about 1000 c.p.s. Impulse noise arising from dial and switch-gear transients in a telephone circuit have frequency components which span this frequency. The circuit following network 71 operates upon the displacement voltage in a highly nonlinear manner to provide an indication of the subjective audibility of the input pulse. It operates to give the same response (output) to all pulse conditions shown in FIG. 6. This response is the desired threshold or loudness indication.

Figure 8:
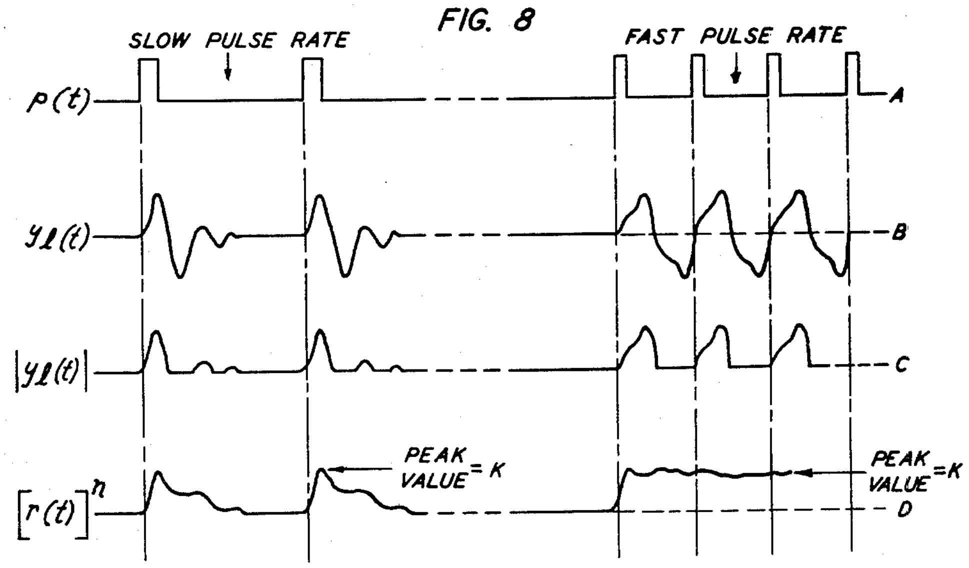
FIG. 8 illustrates the processing of pulses by the circuit shown in FIG. 7.

A magnitude-taking, or rectification, operation is accomplished with diode 72 and resistor 75 (connected in a half wave configuration in FIG. 7. A full wave rectifier circuit may be used, as previously indicated, but since the ear acts essentially as a half wave rectifier itself, the latter has more face validity. The absolute magnitude function $|y_1(t)|$ derived from rectifier 72, shown by way of example in line C of FIG. 8, is next passed through a low pass RC integrator configuration (resistor 73 and capacitor 74) whose time-constant is selected to satisfy the special behavior of the human listener at threshold. This time-constant is dictated by the break point of the curves of FIG. 6 and must be ten milliseconds. The integrated function $r(t)$ is then applied to power-law network 76. The output from the power-law network is $[r(t)]^n$ and this function is illustrated in line D of FIG. 8. The parameters of network 76 are selected for $n=0.6$ and it is realized, for example, by driving a current proportional to $r(t)$ through a resistively bridged diode connected in the forward direction, and utilizing as an output the voltage developed across the diode. The resultant function $[r(t)]^n$ is then supplied to a peak-reading meter 77 of any desired construction. For example, meter 77 may be an oscilloscope, or any of the commercially available peak-reading instruments. The combined operation of the circuit simulating the middle ear and cochlea and the nonlinear elements following yields an output which indicates whether the input pulses $p(t)$ are audible or inaudible, that is, it yields peak values which are the same for all of the pulse stimuli conditions (pulse amplitude, duration pattern, and repetition rate) represented in FIG. 6.

From the foregoing, it is apparent that the instrument of FIG. 7 may be used not only to indicate the audibility or inaudibility of an applied signal but may also form the basis for an instrument which indicates subjective loudness for any levels above threshold. In addition, metering of the subjective audibility of stimuli other than the periodic pulses discussed above may also be achieved. Alterations in the circuit, particularly in the basilar membrane network 71 of FIG. 7, to take account of the gross nature of the sound stimuli are all that are necessary. For example, to meter the audibility or loudness of pure tones, an ensemble of basilar membrane networks can be provided such as shown in FIG. 2. The measuring circuit then selects, via switch 78, the point of greatest membrane displacement, i.e., $y_{max}(t)$, and calculates K for this maximum function. Apparatus for selecting the maximum of a plurality of signals is well known in the art, and may, for example, be similar in form to that described in J. L. Flanagan Patent 2,783,457, February 26, 1957, or in J. L. Flanagan Patent 2,891,111, June 16, 1959. In addition, the meter may be calibrated to indicate the subjective annoyance of pulsive noise or other interfering signals.

The above-described arrangements are, of course, merely illustrative of the application of the principles of the invention. Numerous other arrangements may be devised by those skilled in the art without departing from the spirit and scope of the invention.

What is claimed is:

1. In a testing system for a voice transmission circuit, a network whose transmission response is substantially identical to the transmission properties of the middle ear and the basilar membrane of the human ear, means for coupling said network to a voice transmission circuit, and a nonlinear electrical circuit supplied with signals developed by said network in response to signals in said voice transmission circuit for selectively integrating the absolute magnitude of said developed signals.

2. A testing system for a voice transmission circuit comprising a network whose transmission properties are substantially identical to the transmission properties of the middle ear portion of the human ear, means for applying signals from a voice transmission circuit to said middle ear network, a network whose transmission properties are substantially identical to the transmission properties of the basilar membrane of the human ear at the point of maximum displacement for signals applied thereto from said middle ear network, and a nonlinear electrical circuit supplied with signals developed by said basilar membrane network for selectively integrating the absolute magnitude of said developed signals.

3. A testing system for a voice transmission circuit as defined in claim 2 wherein said middle ear network comprises a four-terminal network that includes a first resistor connected in series with a $\pi$ network comprising an amplifier, a second resistor and an inductor in the series branch thereof, a capacitor connected in shunt with the input of said $\pi$ network at the junction of said first resistor and said $\pi$ network, and a capacitor connected in shunt with the output of said $\pi$ network.

4. A testing system for a voice transmission circuit as defined in claim 2 wherein said basilar membrane network comprises a delay line supplied at its input with signals from said middle ear network, said relay line having a plurality of lateral terminals spaced along its length, and a plurality of four-terminal networks of similar configuration but of different element values each supplied at its input, respectively, with the signal developed at one of said delay line terminals, said networks individually comprising a $\pi$ network that includes a first amplifier, a first resistor, a first inductor, a second amplifier, a second resistor, and a second inductor connected in its series branch, a third resistor shunting its input end, a third capacitor shunting its output end, a fourth capacitor connected to shunt its mid-point, and a fifth capacitor connected between said delay line tap and the input of said $\pi$ network.

5. In a testing system for a voice transmission circuit, a network whose transmission response is substantially identical to the transmission response of the human middle ear, means for supplying signals from a voice communication circuit to said middle ear network, a network whose transmission response is substantially identical to the transmission response of the basilar membrane of the human ear, means for supplying said signals developed by said middle ear network to said basilar membrane network, means for adjusting said basilar membrane network to yield a signal corresponding to the greatest membrane displacement of the human ear for the same applied signals, a nonlinear electrical circuit for rectifying said greatest displacement signals, means for integrating said rectified signals, and means responsive to the peak value of said rectified signals for indicating the subjective loudness of said signals from said voice communication circuit.

6. Apparatus for indicating the degree of audibility of pulsive signals and noise in a communication circuit comprising a network whose transmission response is substantially identical to the transmission response of the middle ear and the basilar membrane of the human ear, means for applying signals from a communication circuit to said network, means supplied with signals developed by said network for developing a signal proportional to the absolute magnitude thereof, means supplied with said absolute magnitude signal for developing a signal proportional to the integral of said absolute magnitude signal, means for altering the magnitude of said integral signal by a selected power function, and means for indicating the peak value of said altered magnitude signal.

7. A voice communication circuit evaluator comprising an electrical network analog to the middle ear and an electrical network analog to the basilar membrane of the human ear connected in tandem, said middle ear network having an input terminal and said basilar membrane network having a plurality of output terminals, means for applying electrical signals to said input terminal of said middle ear network, means for applying the signal developed at a selected one of said output terminals of said basilar membrane network to a passive nonlinear network, means for decreasing the magnitude of the signal developed by said nonlinear network by a predetermined low numerical power, and means for indicating the peak value of said decreased magnitude signal.

8. A voice communication circuit evaluator as defined in claim 7 wherein said signal applied to said passive nonlinear network is selected from that terminal of said basilar membrane network whose developed signal corresponds to a signal developed in the basilar membrane of the human ear at a distance approximately twenty millimeters from the stapes.

9. A voice communication circuit evaluator as defined in claim 7 wherein said predetermined low numerical power is selected to be 0.6.

10. In a testing system for a voice transmission circuit, a network whose transmission response is substantially identical to the transmission properties of the middle ear and the basilar membrane of the human ear at a point of maximum membrane displacement, means for applying a pulsive electrical signal to said network, means for rectifying the signal developed at the output of said network to produce a signal proportional to the absolute magnitude of said signal developed at the output of said network, means for integrating said absolute magnitude signal over an interval of approximately ten milliseconds to produce an integrated signal, means for decreasing the magnitude of said integrated signal by a selected power function to produce a power adjusted signal, and means for developing an indication of the peak value of said power adjusted signal.

11. Apparatus for providing a quantitative indication of subjective loudness of noise and signals present in a telephone circuit, comprising means for simulating the transmission properties of the middle ear and the basilar membrane of the human ear, means for passing electrical signals through said simulating means to develop a signal analogous to the central displacement of the human basilar membrane, and nonlinear circuit means responsive to said developed signal for developing a signal indicative of the subjective audibility of said applied electrical signals.

12. In a testing system having an electrical network whose transmission response is substantially identical to that of the human middle ear and basilar membrane and which comprises, a four-terminal network that includes an input and an output, together with a first resistor and a first $\pi$ network connected in series between said input and output, said first $\pi$ network including a series branch having an amplifier, a second resistor and an inductor connected in series between said input and output, said first $\pi$ network including parallel branches each of which includes a capacitor, a delay line connected to the output of said first $\pi$ network and having a plurality of laterally spaced terminals, and a plurality of second four-terminal networks of similar configuration but of different element values selectively connected to said lateral terminals of said delay line, each of said second four-terminal networks comprising an input and an output together with a capacitor and a second $\pi$ network connected in series to a lateral terminal, said second $\pi$ network including a series branch having a first amplifier, first resistor, a first inductor, a second amplifier, a second resistor, and a second inductor connected in series between said input and output, said second $\pi$ network including parallel branches connected to the input and output wherein the input parallel branch includes a resistor and the output parallel branch includes a capacitor, a third parallel branch connected to the second $\pi$ network at the junction of the first inductor and the second amplifier thereof.

References Cited in the file of this patent

"Loudness Judgments on Clicks" (abstract), Geisler et al., vol. 31, page 128, January 1959.

Journal of the Acoustical Society; "Electrical Model of the Middle Ear" (abstracts), J. Swislocki, vol. 31, page 841, August 1959. "Dimensional Analysis of Cochlear Models," Tonndorf, vol. 32, page 493, April 1960.

Bell System Technical Journal, Flanagan, vol. 39, page 1163ff., September 1960.

"Network Model of the Middle Ear," vol. 33, February 1961, pages 168–176.